United States Patent
Cavallaro et al.

(10) Patent No.: US 8,137,586 B2
(45) Date of Patent: Mar. 20, 2012

(54) PHOSPHOR BLEND FOR A COMPACT FLUORESCENT LAMP AND LAMP CONTAINING SAME

(75) Inventors: Albert M. Cavallaro, Durham, NH (US); Robert E. Levin, Salem, MA (US); Chung-Nin Chau, Sayre, PA (US); Roger B. Hunt, Jr., Medfield, MA (US)

(73) Assignee: Osram Sylvania Inc., Danvers, MA (US)

( * ) Notice: Subject to any disclaimer, the term of this patent is extended or adjusted under 35 U.S.C. 154(b) by 667 days.

(21) Appl. No.: 12/323,088

(22) Filed: Nov. 25, 2008

(65) Prior Publication Data
US 2009/0134769 A1 May 28, 2009

Related U.S. Application Data

(63) Continuation-in-part of application No. PCT/US2008/076405, filed on Sep. 15, 2008.

(60) Provisional application No. 60/972,543, filed on Sep. 14, 2007.

(51) Int. Cl.
*C09K 11/08* (2006.01)
*C09K 11/61* (2006.01)
*H01J 29/10* (2006.01)

(52) U.S. Cl. ........... 252/301.4 H; 252/301.4 P; 313/468

(58) Field of Classification Search ........... 252/301.4 R, 252/301.4 S, 301.4 P, 301.4 H; 313/467, 313/468, 483, 569, 578, 315
See application file for complete search history.

(56) References Cited

U.S. PATENT DOCUMENTS

| 2003/0011310 | A1 | 1/2003 | Juestel et al. | |
|---|---|---|---|---|
| 2003/0155857 | A1* | 8/2003 | Soules et al. | 313/487 |
| 2004/0056256 | A1* | 3/2004 | Bokor et al. | 257/79 |
| 2004/0135486 | A1 | 7/2004 | Mishra et al. | |
| 2005/0096420 | A1* | 5/2005 | Delp et al. | 524/430 |
| 2006/0151747 | A1 | 7/2006 | Manivannan et al. | |
| 2006/0164830 | A1* | 7/2006 | Justel | 362/231 |
| 2006/0267500 | A1* | 11/2006 | Chau et al. | 313/634 |
| 2007/0052340 | A1* | 3/2007 | Kop et al. | 313/486 |

FOREIGN PATENT DOCUMENTS

| EP | 1184893 | A2 | | 3/2002 |
|---|---|---|---|---|
| EP | 1271617 | A2 | | 1/2003 |
| EP | 1428863 | A1 | * | 6/2004 |
| GB | 2408382 | A | | 5/2005 |
| GB | 2411176 | A | | 8/2005 |

* cited by examiner

*Primary Examiner* — Jerry Lorengo
*Assistant Examiner* — Lynne Edmondson
(74) *Attorney, Agent, or Firm* — Robert F. Clark

(57) ABSTRACT

A phosphor blend for a compact fluorescent lamp is described wherein the phosphor blend comprises a green-emitting $Tb^{3+}$ phosphor, a $Y_2O_3:Eu^{3+}$ phosphor, a $Sr_6BP_5O_{20}:Eu^{2+}$ phosphor, a $Mg_4GeO_{5.5}F:Mn^{4+}$ phosphor, and optionally a $BaMgAl_{11}O_{17}:Eu^{2+}$ phosphor, wherein the blend contains from 1% to 20% by weight of the $Sr_6BP_5O_{20}:Eu^{2+}$ phosphor and from 5% to 30% by weight of the $Mg_4GeO_{5.5}F:Mn^{4+}$ phosphor. A compact fluorescent lamp having a phosphor coating containing the phosphor blend produces a light that is perceived as more pleasing than the light produced by standard compact fluorescent lamps.

14 Claims, 5 Drawing Sheets

PHOSPHOR BLEND FOR A COMPACT FLUORESCENT LAMP AND LAMP CONTAINING SAME

CROSS REFERENCE TO RELATED APPLICATIONS

This application is a continuation-in-part of International Application PCT/US2008/76405, with an international filing date of Sep. 15, 2008, which claims the benefit of U.S. Provisional Application No. 60/972,543, filed Sep. 14, 2007.

BACKGROUND OF THE INVENTION

The compact fluorescent lamp (CFL) is finding a greater acceptance in residential lighting applications. This is important for world-wide energy consumption as CFL's are more energy efficient than conventional incandescent lamps. In particular, light produced by a lamp is defined in terms of total luminous flux or lamp lumens. The light produced relative to the input power of the lamp is generally quantified in terms of lumens per watt (LPW). CFLs typically operate in the 50-90 LPW range, in contrast to conventional incandescent lamps that operate in the 15-30 LPW range. Hence, CFL lamps can produce an equivalent light output at one-half to one-third of the power consumption.

Despite this significant advantage in energy savings, barriers to even greater acceptance of CFLs still exist. One of these barriers is that a significant percentage of people remain dissatisfied with the quality of the light produced by CFLs. One measure of light quality is the color rendering index (CRI) which is a measure of the capability of a light source to illuminate an object's hues without distortion. CFL lamps typically have a CRI>80 which is considered high for other artificial light sources such as HID and linear fluorescent lamps. Yet despite their high CRI, the color quality of the CFL lamp is generally found deficient or unacceptable. Therefore, it would be an advantage to find a more "pleasing" light that would lead to a greater acceptance of CFL lamps.

SUMMARY OF THE INVENTION

It is an object of the invention to obviate the disadvantages of the prior art.

It is another object of the invention to provide a phosphor blend for use in a compact fluorescent lamp.

It is a further object of the invention to provide a compact fluorescent lamp that emits light that is more pleasing to a majority of human observers.

In accordance with one object of the invention, there is provided a phosphor blend comprising: a green-emitting $Tb^{3+}$ phosphor, a $Y_2O_3:Eu^{3+}$ phosphor, a $Sr_6BP_5O_{20}:Eu^{2+}$ phosphor, a $Mg_4GeO_{5.5}F:Mn^{4+}$ phosphor, and optionally a $BaMgAl_{11}O_{17}:Eu^{2+}$ phosphor, wherein the blend contains from 1% to 20% by weight of the $Sr_6BP_5O_{20}:Eu^{2+}$ phosphor and from 5% to 30% by weight of the $Mg_4GeO_{5.5}F:Mn^{4+}$ phosphor. Preferably, the phosphor blend also contains from 40% to 70% by weight of the $Y_2O_3:Eu^{3+}$ phosphor, from 20% to 50% by weight of the green-emitting $Tb^{3+}$ phosphor, and from 0 to 10% by weight of the $BaMgAl_{11}O_{17}:Eu^{2+}$ phosphor. Preferably, the green-emitting $Tb^{3+}$ phosphor is selected from a $LaPO_4:Ce^{3+},Tb^{3+}$ phosphor and a $CeMgAl_{11}O_{19}:Tb^{3+}$ phosphor.

In another embodiment, the phosphor blend comprises from 20% to 30% by weight of at least one phosphor selected from a $LaPO_4:Ce^{3+},Tb^{3+}$ phosphor and a $CeMgAl_{11}O_{19}:Tb^{3+}$ phosphor, from 40% to 70% by weight of a $Y_2O_3:Eu^{3+}$ phosphor, from 1% to 5% by weight of a $Sr_6BP_5O_{20}:Eu^{2+}$ phosphor, from 10% to 30% by weight of a $Mg_4GeO_{5.5}F:Mn^{4+}$ phosphor, and from 0 to 2% by weight of a $BaMgAl_{11}O_{17}:Eu^{2+}$ phosphor.

In a further embodiment, the phosphor blend comprises about 27% by weight of a $LaPO_4:Ce^{3+},Tb^{3+}$ phosphor, about 54% by weight of a $Y_2O_3:Eu^{3+}$ phosphor, about 5% by weight of a $Sr_6BP_5O_{20}:Eu^{2+}$ phosphor, about 15% by weight of a $Mg_4GeO_{5.5}F;Mn^{4+}$ phosphor, and less than about 0.1% by weight of a $BaMgAl_{11}O_{17}:Eu^{2+}$ phosphor.

In yet a further embodiment, the green-emitting phosphor is a $CeMgAl_{11}O_{19}:Tb^{3+}$ phosphor and the blend contains from 50 to 60% by weight of the $Y_2O_3:Eu^{3+}$ phosphor, from 25 to 35% by weight of the $CeMgAl_{11}O_{19}:Tb^{3+}$ phosphor, from 3% to 8% by weight of the $Sr_6BP_5O_{20}:Eu^{2+}$ phosphor, and from 5 to 15% by weight of the $Mg_4GeO_{5.5}F:Mn^{4+}$ phosphor.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Human surveys were conducted to identify a phosphor blend that could be used in a CFL lamp to produce light having a more "pleasing" quality. In order perform the surveys, a variety of CFL lamps were constructed with individual phosphor types that ranged from deep-blue to deep-red emitting. The test lamps containing the individual phosphor types are listed in Table 1 and their spectral power distributions are shown in FIGS. 1-5. The LAP phosphor is a green-emitting $Tb^{3+}$ phosphor which may be substituted for in this invention by other phosphors which exhibit the green $Tb^{3+}$ emission, e.g., $CeMgAl_{11}O_{19}:Tb^{3+}$ (CAT).

TABLE 1

Figure 1:
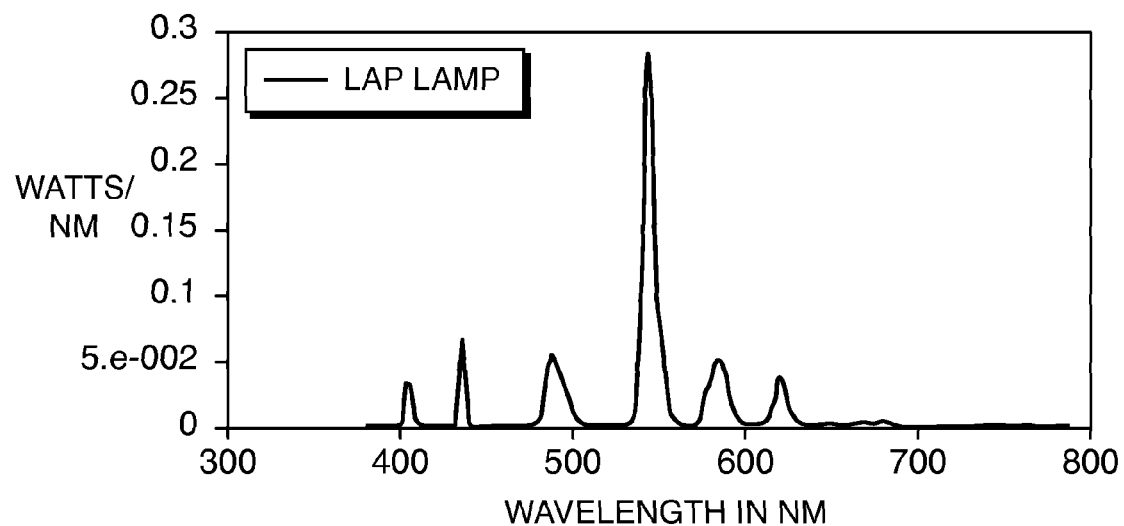
FIG. 1 is a spectral power distribution of a CFL lamp made with a $LaPO_4:Ce^{3+}, Tb^{3+}$ (LAP) phosphor.
Figure 2:
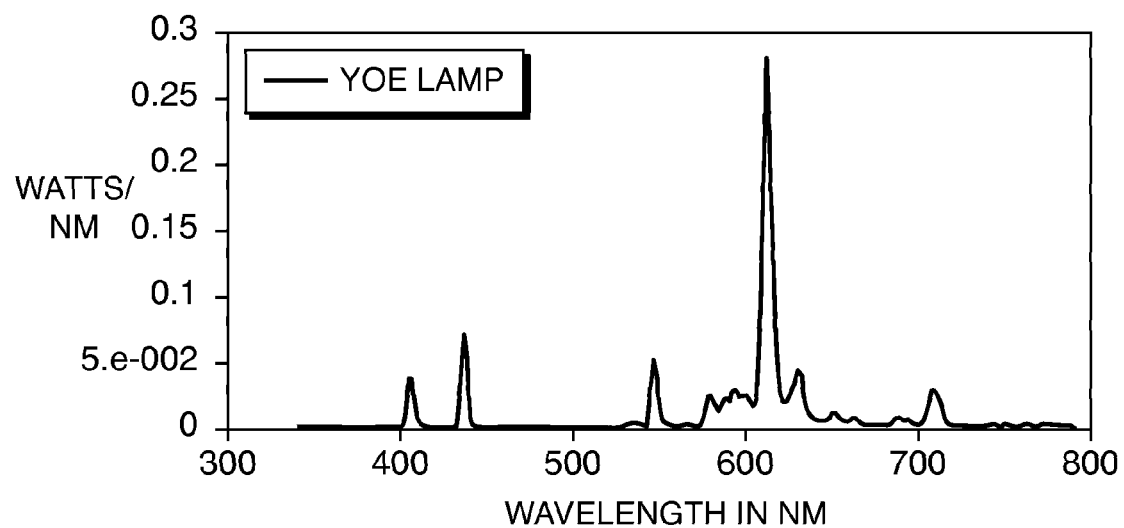
FIG. 2 is a spectral power distribution of a CFL lamp made with a $Y_2O_3:Eu^{3+}$ phosphor (YOE).
Figure 3:
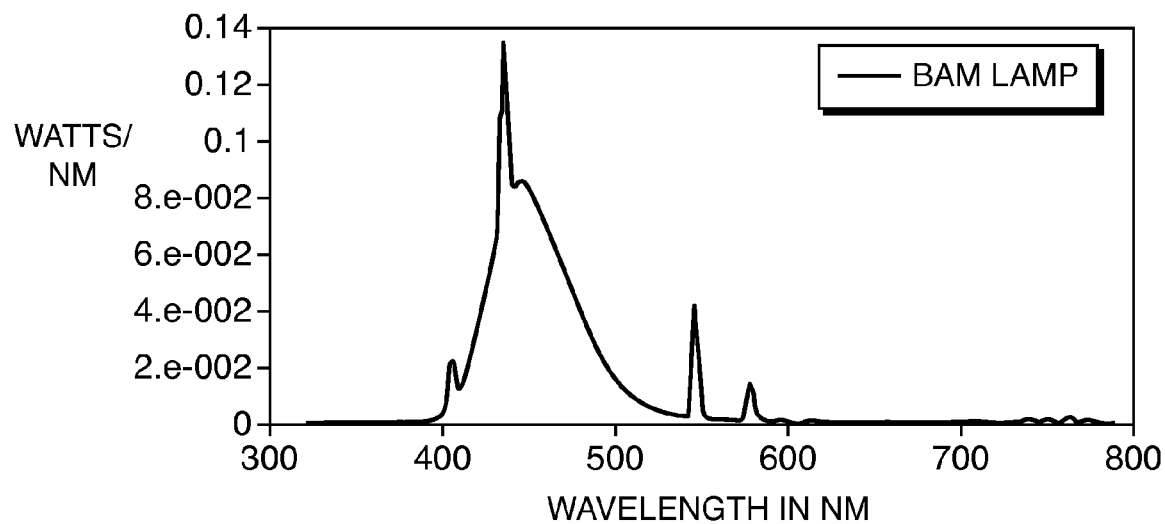
FIG. 3 is a spectral power distribution of a CFL lamp made with a $BaMgAl_{11}O_{17}:Eu^{2+}$ phosphor (BAM).
Figure 4:
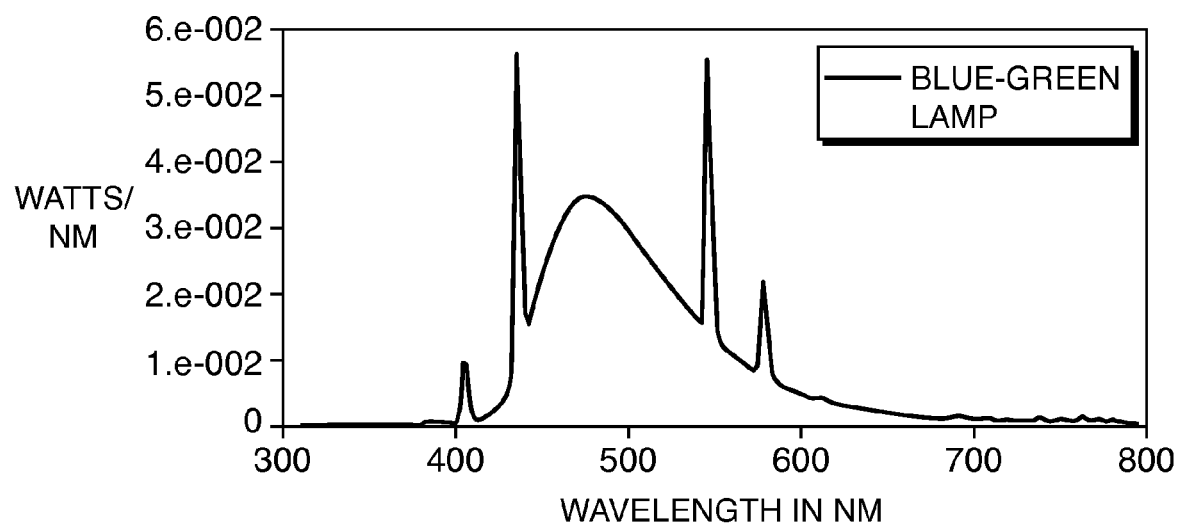
FIG. 4 is a spectral power distribution of a CFL lamp made with a $Sr_6BP_5O_{20}:Eu^{2+}$ phosphor.
Figure 5:
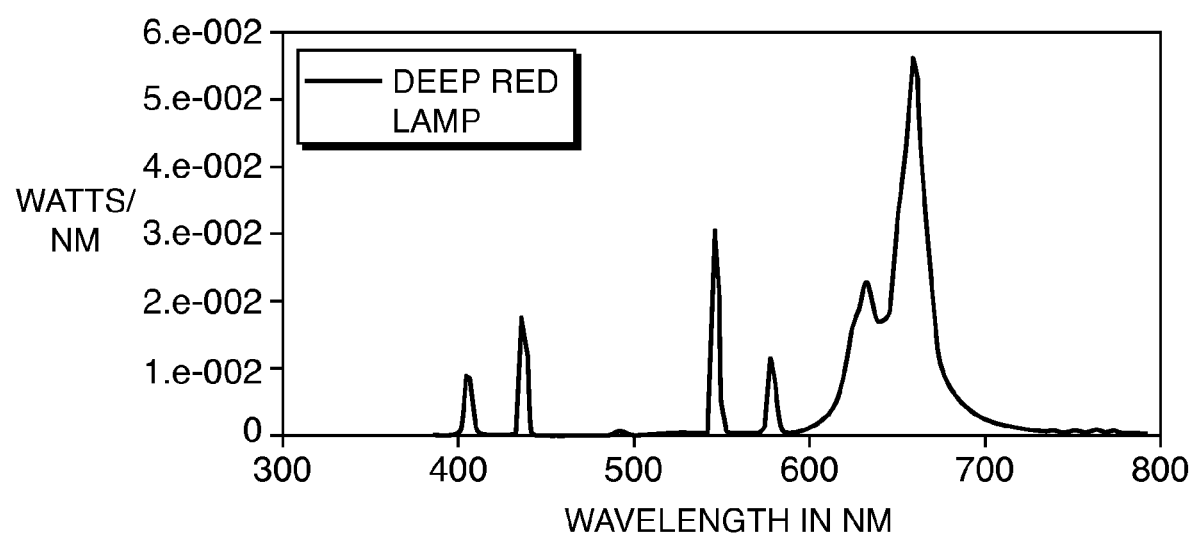
FIG. 5 is a spectral power distribution of a CFL lamp made with a $Mg_4GeO_{5.5}F:Mn^{4+}$ phosphor.

| Phosphor | Emission Color | Spectral Power Distribution |
|---|---|---|
| $LaPO_4:Ce^{3+}, Tb^{3+}$ (LAP) | yellow-green | FIG. 1 |
| $Y_2O_3:Eu^{3+}$ (YOE) | orange-red | FIG. 2 |
| $BaMgAl_{11}O_{17}:Eu^{2+}$ (BAM) | deep blue | FIG. 3 |
| $Sr_6BP_5O_{20}:Eu^{2+}$ (SBP) | blue-green | FIG. 4 |
| $Mg_4GeO_{5.5}F:Mn^{4+}$ (MFG) | very deep red | FIG. 5 |

Using dimming ballasts, the light from these lamps was mixed in various proportions with the light from a primary 2700 K white CFL lamp. A number of colored materials were then inspected under the mixed illumination. The colored materials ranged from pastel colors to saturated colors. With a first group of observers, it was possible to select two phosphor types that elicited a "pleasing" or "preferred" response from the observers. The colored materials generally appeared more "vivid" under the blended light source.

Using the results of this polling sample, 26W CFL lamps were produced with the individual phosphor types blended according to the proportions deduced in the initial screening with dimmed sources in order to produce white light near the standard 2700 K correlated color temperature (CCT). Although 2700 K was chosen as the target color temperature for this blend, similar effects are expected for other color temperatures, e.g., 3000 K, 3500 K, 4100 K and 5000 K. The composition of the enhanced CFL phosphor blend is given in Table 2.

TABLE 2

Enchanced CFL Blend

| Phosphor | Weight Percentage |
|---|---|
| $LaPO_4:Ce^{3+}, Tb^{3+}$ (LAP) | 26.8% |
| $Y_2O_3:Eu^{3+}$ (YOE) | 54.0% |
| $BaMgAl_{11}O_{17}:Eu^{2+}$ (BAM) | <0.1% |
| $Sr_6BP_5O_{20}:Eu^{2+}$ (SBP) | 4.7% |
| $Mg_4GeO_{5.5}F; Mn^{4+}$ (MFG) | 14.5% |

Figure 6:
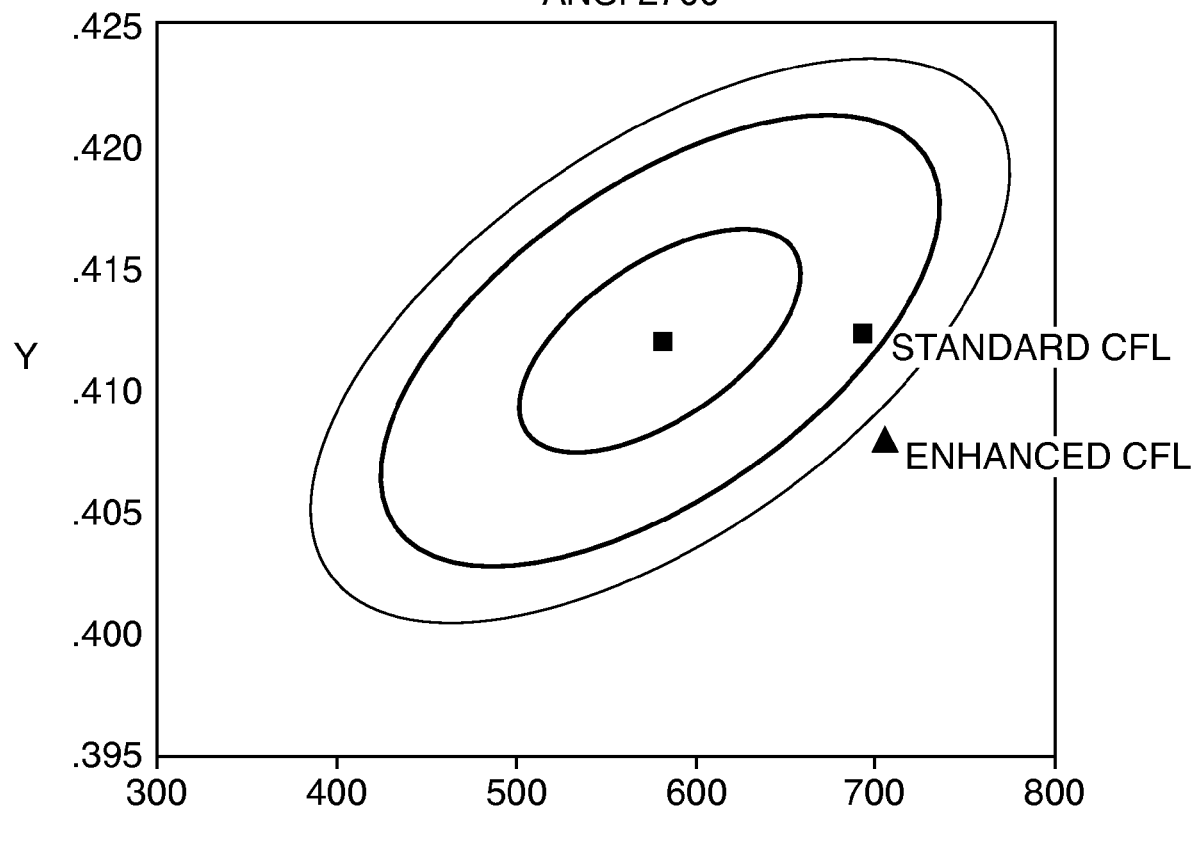
FIG. 6 is a plot of the x,y color coordinates of a standard CFL lamp and an enhanced CFL lamp according to this invention.

The color metrics of the enhanced CFL lamps are compared with the standard CFL lamp in Table 3 and FIG. 6.

TABLE 3

| Lamp | Lumens | x-chromaticity | y-chromaticity | CRI | Correlated Color Temperature |
|---|---|---|---|---|---|
| Enhanced CFL | 1184 | 0.465 | 0.408 | 87 | 2606 |
| Standard CFL | 1657 | 0.465 | 0.412 | 82 | 2648 |

These lamps were used to illuminate two separate, but identical viewing scenes consisting of: (1) manikins with colorful clothing, (2) manikins with dark clothing, (3) wooden furniture, (4) framed pictures, (5) fruits and vegetables, (6) cut flowers, and (7) neutral-toned walls and window trims. The purpose of these scenes was to represent typical items found in a household.

In the testing, incandescent lighting was included to represent a familiar polling control. The polling procedure was to ask a group of 35 observers, representing a range of age, sex and race to vote their preference for the appearance of the two viewing scenes as the illumination of the scenes was varied. The conditions for the different polls are given in Table 4.

TABLE 4

| Poll 1 | Both viewing scenes, (A) and (B) illuminated with incandescent lamps |
|---|---|
| Poll 2 | Viewing scenes illuminated with (A) incandescent and (B) enhanced CFL |
| Poll 3 | Viewing scenes illuminated with (A) incandescent and (B) enhanced CFL |
| Poll 4 | Viewing scenes illuminated with (A) standard CFL and (B) incandescent |
| Poll 5 | Viewing scenes illuminated with (A) standard and (B) enhanced CFL (replication of Poll 2) |
| Poll 6 | Viewing scenes illuminated with (A) standard and (B) enhanced CFL. Observers approached the illuminated areas and evaluated their skin tones. |

The observers were selected to represent an unbiased sample of age and sex (Table 5). No observers reported color vision deficiency. The polling results are presented in Table 6.

TABLE 5

|  | Male | Female | Total |
|---|---|---|---|
| less than 40 years age | 7 | 9 | 16 |
| greater than 40 years age | 9 | 10 | 19 |
| Total | 16 | 19 | 35 |

TABLE 6

All Participants

|  |  |  |  |
|---|---|---|---|
| Poll 1 Preferred | Incandescent 16 | Incandescent 15 | Undecided 4 |
| Poll 2 Preferred | Standard CFL 8 | Enhanced CFL 24 | Undecided 3 |
| Poll 3 Preferred | Incandescent 15 | Enhanced CFL 19 | Undecided 1 |
| Poll 4 Preferred | Standard CFL 13 | Incandescent 20 | Undecided 2 |
| Poll 5 (repeat of 2) Preferred | Standard CFL 7 | Enhanced CFL 20 | Undecided 8 |
| Poll 6 skin tone Preferred | Standard CFL 5 | Enhanced CFL 16 | Undecided 14 |

The control poll is Poll 1, where identical lamps were used in both chambers. Response variables were assigned as shown in Table 7.

TABLE 7

| Preferred Scene A | Preferred Scene B | No preference |
|---|---|---|
| −1 | 1 | 0 |

The mean value of the polls will become zero if there is no preference. The mean value will be positive if Scene A is preferred. The Student's T-test is then calculated to find the probability that the mean is zero, P(0) in Table 8. Polls 2, 5 and 6 are shown to be significantly different from zero. The means in these cases are all positive indicating the preference for the enhanced CFL lamps.

TABLE 8

| Variable | N | Mean | σ | Std Error in Mean | Mean 95% confidence interval | | T test | P(0) |
|---|---|---|---|---|---|---|---|---|
| Poll 1 | 35 | −0.029 | 0.954 | 0.161 | −0.356 | 0.299 | −0.18 | 0.86 |
| Poll 2 | 35 | 0.457 | 0.852 | 0.144 | 0.164 | 0.750 | 3.17 | 0.003 |
| Poll 3 | 35 | 0.114 | 0.993 | 0.168 | −0.227 | 0.455 | 0.68 | 0.501 |
| Poll 4 | 35 | 0.200 | 0.964 | 0.163 | −0.131 | 0.531 | 1.23 | 0.228 |
| Poll 5 | 35 | 0.371 | 0.808 | 0.136 | 0.094 | 0.649 | 2.72 | 0.01 |
| Poll 6 | 35 | 0.314 | 0.718 | 0.121 | 0.068 | 0.561 | 2.59 | 0.014 |

A paired t-test was also calculated to determine the mean difference from the control test, namely Poll 1. The probability that the polls differ from the control is found in P(0) in Table 9 below. Polls 2 and 5 are significantly different from zero. The mean difference in these cases are both positive indicating the preference for the enhanced CFL.

TABLE 9

| Variable | N | Mean Difference | σ | Std Error in Mean difference | Mean difference 95% confidence interval | | T test | P(0) |
|---|---|---|---|---|---|---|---|---|
| Poll 1 | 35 | 0.000 | 0.000 | 0.000 | 0.000 | 0.000 | na | na |
| Poll 2 | 35 | 0.486 | 1.245 | 0.211 | 0.058 | 0.914 | 2.31 | 0.027 |
| Poll 3 | 35 | 0.143 | 1.498 | 0.253 | −0.372 | 0.657 | 0.56 | 0.576 |
| Poll 4 | 35 | 0.229 | 1.239 | 0.209 | −0.197 | 0.654 | 1.09 | 0.283 |
| Poll 5 | 35 | 0.400 | 1.143 | 0.193 | 0.007 | 0.793 | 2.07 | 0.046 |
| Poll 6 | 35 | 0.343 | 1.187 | 0.201 | −0.065 | 0.751 | 1.71 | 0.097 |

Figure 7:
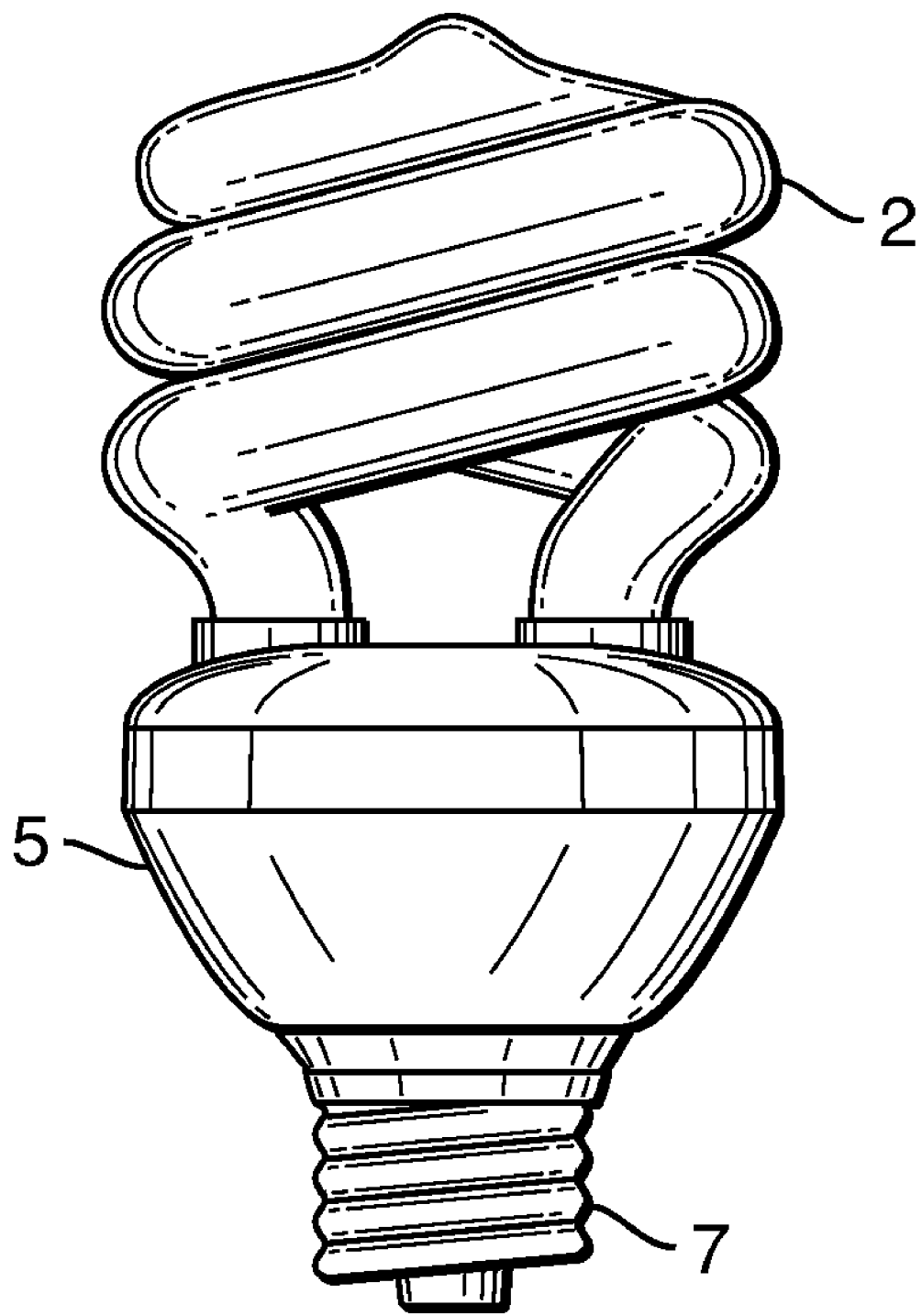
FIG. 7 is an illustration of a compact fluorescent lamp.

A compact fluorescent lamp is illustrated in FIG. 7. The lamp has a spiral-shaped tubular envelope 2 that has a phosphor coating containing a phosphor blend according to this invention on the inner surface of the tubular envelope. The envelope 2 further contains a small amount of mercury and a pair of electrodes for generating a low-pressure mercury gas discharge. The envelope 2 is mounted on a self-contained ballast 5 for operating the lamp and has a conventional screw base 7.

Alternative blends for 2700 K CFL applications are shown in Tables 10 and 11.

TABLE 10

| Phosphor | Weight Percentage |
|---|---|
| $CeMgAl_{11}O_{19}:Tb^{3+}$ (CAT) | 30.5% |
| $Y_2O_3:Eu^{3+}$ (YOE) | 57.5% |
| $Sr_6BP_5O_{20}:Eu^{2+}$ (SBP) | 4.0% |
| $Mg_4GeO_{5.5}F; Mn^{4+}$ (MFG) | 8.0% |

TABLE 11

| Phosphor | Weight Percentage |
|---|---|
| $CeMgAl_{11}O_{19}:Tb^{3+}$ (CAT) | 26.3% |
| $Y_2O_3:Eu^{3+}$ (YOE) | 53.7% |
| $Sr_6BP_5O_{20}:Eu^{2+}$ (SBP) | 6.3% |
| $Mg_4GeO_{5.5}F; Mn^{4+}$ (MFG) | 13.7% |

While there have been shown and described what are at present considered to be preferred embodiments of the invention, it will be apparent to those skilled in the art that various changes and modifications can be made herein without departing from the scope of the invention as defined by the appended claims.

We claim:

1. A phosphor blend for a compact fluorescent lamp, comprising: a green-emitting $Tb^{3+}$ phosphor, a $Y_2O_3:Eu^{3+}$ phosphor, a $Sr_6BP_5O_{20}:Eu^{2+}$ phosphor, a $Mg_4GeO_{5.5}F; Mn^{4+}$ phosphor, and optionally a $BaMgAl_{11}O_{17}:Eu^{2+}$ phosphor, wherein the blend contains from 1% to 20% by weight of the $Sr_6BP_5O_{20}:Eu^{2+}$ phosphor and from 5% to 30% by weight of the $Mg_4GeO_{5.5}F:Mn^{4+}$ phosphor.

2. The phosphor blend of claim 1 wherein the blend contains from 40% to 70% by weight of the $Y_2O_3:Eu^{3+}$ phosphor, from 20% to 50% by weight of the green-emitting $Tb^{3+}$ phosphor, and from 0 to 10% by weight of the $BaMgAl_{11}O_{17}:Eu^{2+}$ phosphor.

3. A phosphor blend for a compact fluorescent lamp, comprising from 20% to 30% by weight of at least one phosphor selected from a $LaPO_4:Ce^{3+}, Tb^{3+}$ phosphor and a $CeMgAl_{11}O_{19}:Tb^{3+}$ phosphor, from 40% to 70% by weight of a $Y_2O_3:Eu^{3+}$ phosphor, from 1% to 5% by weight of a $Sr_6BP_5O_{20}:Eu^{2+}$ phosphor, from 10% to 30% by weight of a $Mg_4GeO_{5.5}F:Mn^{4+}$ phosphor, and from 0 to 2% by weight of a $BaMgAl_{11}O_{17}:Eu^{2+}$ phosphor.

4. The phosphor blend of claim 3 wherein the phosphor blend contains about 27% by weight of the $LaPO_4:Ce^{3+}, Tb^{3+}$ phosphor, about 54% by weight of the $Y_2O_3:Eu^{3+}$ phosphor, about 5% by weight of the $Sr_6BP_5O_{20}:Eu^{2+}$ phosphor, about 15% by weight of the $Mg_4GeO_{5.5}F:Mn^{4+}$ phosphor, and less than about 0.1% by weight of the $BaMgAl_{11}O_{17}:Eu^{2+}$ phosphor.

5. The phosphor blend of claim 4 wherein the phosphor blend contains 26.8% by weight of the $LaPO_4:Ce^{3+}, Tb^{3+}$ phosphor, 54.0% by weight of the $Y_2O_3:Eu^{3+}$ phosphor, 4.7% by weight of the $Sr_6BP_5O_{20}:Eu^{2+}$ phosphor, and 14.5% by weight of the $Mg_4GeO_{5.5}F:Mn^{4+}$ phosphor.

6. A compact fluorescent lamp having a phosphor coating comprising a blend of a green-emitting $Tb^{3+}$ phosphor, a $Y_2O_3:Eu^{3+}$ phosphor, a $Sr_6BP_5O_{20}:Eu^{2+}$ phosphor, a $Mg_4GeO_{5.5}F:Mn^{4+}$ phosphor, and optionally a $BaMgAl_{11}O_{17}:Eu^{2+}$ phosphor, wherein the blend contains from 1% to 20% by weight of the $Sr_6BP_5O_{20}:Eu^{2+}$ phosphor and from 5% to 30% by weight of the $Mg_4GeO_{5.5}F:Mn^{4+}$ phosphor.

7. The compact fluorescent lamp of claim 6 wherein the blend contains from 40% to 70% by weight of the $Y_2O_3:Eu^{3+}$ phosphor, from 20% to 50% by weight of the green-emitting $Tb^{3+}$ phosphor, and from 0 to 10% by weight of the $BaMgAl_{11}O_{17}:Eu^{2+}$ phosphor.

8. The compact fluorescent lamp of claim 6 wherein the lamp produces light having a correlated color temperature of about 2700 K.

9. The compact fluorescent lamp of claim 6 wherein the blend contains from 20% to 30% by weight of at least one phosphor selected from a $LaPO_4:Ce^{3+}, Tb^{3+}$ phosphor and a $CeMgAl_{11}O_{19}:Tb^{3+}$ phosphor, from 40% to 70% by weight of the $Y_2O_3:Eu^{3+}$ phosphor, from 1% to 5% by weight of the $Sr_6BP_5O_{20}:Eu^{2+}$ phosphor, from 10% to 30% by weight of the $Mg_4GeO_{5.5}F:Mn^{4+}$ phosphor, and from 0 to 2% by weight of the $BaMgAl_{11}O_{17}:Eu^{2+}$ phosphor.

10. The compact fluorescent lamp of claim 9 wherein the blend contains about 27% by weight of the $LaPO_4:Ce^{3+}, Tb^{3+}$ phosphor, about 54% by weight of the $Y_2O_3:Eu^{3+}$ phosphor, about 5% by weight of the $Sr_6BP_5O_{20}:Eu^{2+}$ phosphor, about 15% by weight of the $Mg_4GeO_{5.5}F:Mn^{4+}$ phosphor, and less than about 0.1% by weight of the $BaMgAl_{11}O_{17}:Eu^{2+}$ phosphor.

11. The compact fluorescent lamp of claim 10 wherein the blend contains 26.8% by weight of the $LaPO_4:Ce^{3+}, Tb^{3+}$ phosphor, 54.0% by weight of the $Y_2O_3:Eu^{3+}$ phosphor, 4.7% by weight of the $Sr_6BP_5O_{20}:Eu^{2+}$ phosphor, and 14.5% by weight of the $Mg_4GeO_{5.5}F:Mn^{4+}$ phosphor.

12. The compact fluorescent lamp of claim 11 wherein the lamp produces light having a correlated color temperature of about 2700 K.

13. The compact fluorescent lamp of claim 6 wherein the green-emitting phosphor is a $CeMgAl_{11}O_{19}:Tb^{3+}$ phosphor and the blend contains from 50 to 60% by weight of the $Y_2O_3:Eu^{3+}$ phosphor, from 25 to 35% by weight of the $CeMgAl_{11}O_{19}:Tb^{3+}$ phosphor, from 3% to 8% by weight of the $Sr_6BP_5O_{20}:Eu^{2+}$ phosphor, and from 5 to 15% by weight of the $Mg_4GeO_{5.5}F:Mn^{4+}$ phosphor.

14. The phosphor blend of claim 1 wherein the green-emitting phosphor is a $CeMgAl_{11}O_{19}:Tb^{3+}$ phosphor and the blend contains from 50 to 60% by weight of the $Y_2O_3:Eu^{3+}$ phosphor, from 25 to 35% by weight of the $CeMgAl_{11}O_{19}:Tb^{3+}$ phosphor, from 3% to 8% by weight of the $Sr_6BP_5O_{20}:Eu^{2+}$ phosphor, and from 5 to 15% by weight of the $Mg_4GeO_{5.5}F:Mn^{4+}$ phosphor.

* * * * *